United States Patent [19]

Creighton et al.

[11] 4,004,061
[45] Jan. 18, 1977

[54] ADHESIVES

[75] Inventors: Gordon Robert Creighton, Cambridge; Barry James Hayes, Little Eversden, both of England

[73] Assignee: Ciba-Geigy Corporation, Ardsley, N.Y.

[22] Filed: Jan. 14, 1974

[21] Appl. No.: 433,312

[30] Foreign Application Priority Data

Jan. 26, 1973 United Kingdom ............ 4171/73

[52] U.S. Cl. .......................... 428/349; 156/283; 156/315; 156/313; 427/202; 427/407 R; 427/207 A; 428/354

[51] Int. Cl.² .......................................... C09J 7/02

[58] Field of Search ............... 156/62.2, 246, 247, 156/283, 289, 313, 314, 315, 330, 310, 309, 249, 238, 239, 324; 161/167, 184, 406, 410; 117/16, 68.5, 62.2, 72, 68, 76 A, 122 H, 76 F, 122 PF, 119.6, 161 ZB, 122 R; 264/213, 216; 427/207, 407, 208, 180, 202, 209, 386, 410, 411, 147; 428/343, 355, 354, 40, 323, 327, 353, 413, 414, 349

[56] References Cited

UNITED STATES PATENTS

| 2,199,597 | 5/1940 | Renfrew et al. ............... 156/283 |
| 2,607,709 | 8/1952 | Simpson et al. ............... 156/315 |
| 2,650,185 | 8/1953 | Larson et al. ................. 156/313 |
| 2,872,365 | 2/1959 | de Bruyne et al. ............. 428/40 |
| 2,915,490 | 12/1959 | Hopper et al. ............... 156/330 |
| 2,951,004 | 8/1960 | Martin et al. ................ 156/309 |
| 2,975,091 | 3/1961 | Tobey ...................... 117/122 H |
| 3,008,848 | 11/1961 | Annonio ...................... 427/407 |
| 3,231,443 | 1/1966 | McNulty ...................... 156/310 |
| 3,265,664 | 8/1966 | Fulmer et al. ................ 156/313 |
| 3,634,169 | 1/1972 | Garnish ....................... 161/184 |
| 3,703,434 | 11/1972 | Schaaf ........................ 161/167 |
| 3,723,223 | 3/1973 | Le Compte ................... 156/306 |

FOREIGN PATENTS OR APPLICATIONS

| 1,934,592 | 7/1968 | Germany ....................... 156/247 |
| 94,970 | 8/1960 | Netherlands .................... 156/309 |

Primary Examiner—Douglas J. Drummond
Assistant Examiner—J. J. Gallagher
Attorney, Agent, or Firm—Luther A. R. Hall

[57] ABSTRACT

Making film adhesives from a thermosettable resin composition presents difficulties if the composition is not soluble in a volatile solvent, or not readily fusible without gelling prematurely, or undergoes undesirable advancement on being subjected to extrusion procedures.

Such compositions in the form of solid particles can be made into film adhesives by coating a carrier with a readily-curable thermosettable resin composition, which is preferably tacky, applying the solid particles to the coating, and then curing the coating under conditions such that the particles of thermosettable resin composition remain curable.

10 Claims, No Drawings

ADHESIVES

This invention relates to adhesives in film form, commonly called "film adhesives", containing thermosettable resins, and to their preparation and use.

Structural adhesive bonding is a well established procedure in the manufacture of aircraft, and similar industries. Adhesives commonly employed for this purpose are based on thermosetting resins such as phenol-aldehyde resins and epoxide resins. They are often used in the form of solid films, thereby eliminating difficulties which occur when a liquid adhesive is used, such as evaporation of a solvent, loss of adhesive from the required site, and uneven distribution.

Conventionally, film adhesives are prepared by techniques involving evaporation of a solvent or by extrusion. In the former method a resin composition is dissolved in a volatile solvent and the solution is poured onto a flat surface: the solvent is then evaporated, leaving a film of the composition. In the latter method the resin composition is heated to its melting point, extruded through a narrow slit, and then cooled or allowed to cool. While one or other of these methods is suitable for making a film adhesive from many kinds of resin they are unsuitable for making a film adhesive out of a resin which is both substantially insoluble in volatile solvents and not readily fusible, such as a thermosettable resin in the B-stage and certain resins of very high molecular weight. They are also unsuitable for use with compositions in which a latent curing effect is achieved by using discrete particles of a solid resin and discrete particles of a solid hardener, the resin and hardener not reacting together whilst the components are in particulate form but starting to cure as soon as the components are brought into intimate contact by being dissolved in a solvent or by being fused together. Extrusion methods also suffer from the disadvantage that the advancement of the resin which may result can shorten the shelf-life of the film and lead to the premature gelation of the resin composition.

A method has now been found by which a film adhesive may be prepared from a solid, thermosettable resin without causing advancement of that resin: the shelf-life of the film adhesive is thus dependent only upon the nature of the resin and hardener and not upon the conditions of its manufacture.

The new film adhesives are made by a. forming on a support a layer of a first liquid thermosettable resin adhesive composition,
b. applying to the said layer discrete solid particles of a second solid thermosettable resin adhesive composition, the said compositions being such that the said first composition can be cured under conditions in which the said second composition does not substantially cure,
c. curing the said first composition (or allowing it to cure) under conditions such that the said second composition does not substantially cure, and
d. optionally finally removing the solid film adhesive so made from the support. Preferably the two compositions are such that the said first composition cures substantially more rapidly at the temperature at which the film adhesive is made than does the said second composition, and curing of the said first composition is effected at a temperature too low to permit substantial curing of the said second composition within the time taken for the said first composition to cure.

The invention thus provides a film adhesive, which may be supported on a carrier, comprising a layer of a thermoset (i.e. cured) resin composition having adhering thereto solid particles of a thermosettable (i.e. still curable) resin composition. Preferably, when a permanent support for the film adhesive is required, the carrier is a sheet-like material which bears on its opposite face a further layer of thermoset resin composition, which may be the same as or different from that on the other face, having adhering thereto solid particles of a thermosettable resin composition, which may also be the same as or different from that on the other face.

According to a preferred method of making a film adhesive of the invention, the said first thermosettable resin composition has sufficient tack, if necessary after evaporation of a solvent therefrom, to cause the solid particles of the said second resin composition to adhere thereto when they are contacted with it.

The present invention further provides a method of bonding two surfaces together which comprises sandwiching between, and in contact with, the two surfaces a film adhesive in accordance with this invention and heating, preferably under pressure, to convert the said second resin composition into the C-stage.

By "thermosettable resin composition" is meant a substance or a mixture of substances which, by heating, can be converted into a cured, cross-linked, infusible product.

By "liquid thermosettable resin composition" is meant not only a thermosettable resin composition which is above its melting temperature but also a solution, suspension, or an emulsion of a thermosettable resin composition in a solvent or a suspending medium.

By "discrete solid particles of a thermosettable resin composition" is meant not only particles of resins which are solid (i.e. which are at a temperature below their melting point) but also liquid resins which have been absorbed onto a particulate solid support and which then have the physical (handling) characteristics of a solid.

By "thermoset composition" is meant the cured, cross-linked, infusible product obtained by curing a thermosettable resin composition.

The terms "B-stage" and "C-stage" are used herein in the sense defined in ASTM D-883-62T "Tentative Nomenclature relating to Plastics".

The first liquid thermosettable resin composition preferably cures at room temperature (i.e., about 18° to 25° C), and it may contain a resin of any thermosettable type, such as a polyisocyanate prepolymer, a polyester, and especially a phenol-aldehyde or an epoxide resin. Such resins may be free-flowing or viscous liquids, or they may be solutions or suspensions of solids. If they are not free-flowing liquids it is convenient to dissolve or suspend them in a liquid for application to the support. Suitable solvents and suspending agents include low-boiling organic liquids such as ketones, alcohols, aromatic or aliphatic hydrocarbons, and, for preference, halogenated hydrocarbons. The liquid resin composition may contain conventional hardeners and accelerators if required. Known tackifiers, whilst not generally necessary, may also be incorporated.

The second thermosettable resin composition must commence curing at an appreciable rate only at a temperature which is higher, generally at least 30° C, and preferably from 50° to 250° C higher, than the temperature at which the first composition cures within a relatively short time: a composition which commences curing substantially only at above 70° C, and especially one which cures substantially only at above 100° C, is particularly preferred. Examples of resin components for the second thermosettable resin compositions include epoxide resins which are in the B-stage, epoxide resins which have been advanced by reaction with a diol (especially a dihydric phenol such as 2,2-bis(p-hydroxyphenyl)propane), phenolic resoles in the B-stage, and polyamic acids and other intermediates for polyimides.

The solid particulate thermosetting resin composition may also contain a curing agent for the resin, for example, a latent curing agent intimately mixed with the resin, or a curing agent in the form of separate discrete particles which blend with the resin particles on fusion, and those skilled in the art of resin technology will readily be able to determine by routine examination suitable curing agents for a particular resin. The particle size of the solid resin composition may vary, depending upon the ultimate use of the film adhesive. Preferably the particles are at least 60 μm and at most 1.5 mm and especially from 100 to 300 μm. Suitable proportions of the two thermosettable resin compositions can also be readily found by routine experimentation; generally, the ratio of liquid thermosettable resin composition (from which the layer of thermoset resin composition is prepared in situ to that of the solid particles of thermosettable resin composition is from 2:1 to 1:10, and preferably 1:1 to 1:5, by weight.

Epoxide resins, i.e., substances containing on average more than one 1,2-epoxide group per molecule, which may be employed include those containing terminal 1,2-epoxyethyl groups, especially as 2,3-epoxypropyl groups directly attached to an oxygen, nitrogen, or sulphur atom.

As examples of such resins may be mentioned polyglycidyl esters obtainable by reaction of a compound containing, per molecule, two or more free carboxyl groups with epichlorohydrin or glycerol dichlorohydrin in the presence of an alkali. Such polyglycidyl esters may be derived from aliphatic polycarboxylic acids, cycloaliphatic polycarboxylic acids, and from aromatic polycarboxylic acids.

Further examples are polyglycidyl ethers obtainable by reaction of a compound containing, per molecule, at least two free alcoholic hydroxyl or phenolic hydroxyl groups with epichlorohydrin or glycerol dichlorohydrin under alkaline conditions or, alternatively, in the presence of an acidic catalyst and subsequent treatment with alkali. These ethers may be derived from acyclic alcohols and from alcohols having aromatic nuclei, or they may be derived from mononuclear and polynuclear phenols, including novolacs.

Poly(N-glycidyl) compounds include, for example, those obtained by dehydrochlorination of the reaction products of epichlorohydrin with aromatic, cycloaliphatic, or aliphatic amines containing at least two amino-hydrogen atoms; triglycidyl isocyanurate; and N,N'-diglycidyl derivatives of cyclic ureas.

Examples of poly(S-glycidyl) compounds are di-S-glycidyl derivatives of dithiols.

Epoxide resins having terminal 1,2-epoxide groups attached to different kinds of hetero atoms may be employed, e.g., the N,N,O-triglycidyl derivative of p-aminophenol and glycidyl ether-glycidyl esters of salicylic acid and phenolphthalein.

There may also be used, although they are less preferred, epoxide resins wherein the 1,2-epoxide groups are internal, including those containing both terminal and internal epoxide groups.

If desired, a mixture of epoxide resins or of an epoxide resin with a monoepoxide such as a lower alkyl or an aryl glycidyl ether or a glycidyl ester of mixed highly branched, aliphatic, predominantly tertiary monocarboxylic acids may be used.

The preferred epoxide resins are polyglycidyl ethers of polyhydric phenols.

Phenolic resins which may be used are those prepared by reaction of an aldehyde with a substituted phenol such as cresol and resorcinol, or, for preferance, phenol itself. The preferred aldehyde is formaldehyde but it may be replaced, at least in part, by other aldehydes such as acetaldehyde, benzaldehyde, and furfural. The ratio of the aldehyde to the phenol may vary widely, resins having a molar ratio of aldehyde to phenol in the range 1 : 1.2-2 being preferred.

Polyisocyanate prepolymers which may be employed include those obtained by reaction of an organic compound containing at least two isocyanate groups per molecule with a compound containing at least two alcoholic hydroxyl groups per molecule. Suitable di- and higher isocyanates include aromatic, aliphatic, and cycloaliphatic di-isocyanates, while suitable polyhydric alcohols include poly(oxyalkylene) polyols and hydroxy-terminated polyesters.

The support or carrier is preferably a solid, self-sustaining sheet, and it may be permeable or impermeable to the first, liquid resin composition. Suitable permeable carriers include sheets of paper, and foraminous structures such as textiles, including textiles of synthetic materials, especially nylons and polyesters, and glass fibre. Suitable impermeable carriers may be films of organic polymers, such as polyethylene and polypropylene, or thin metallic sheets such as aluminium foil.

The film adhesive may be made continuously or discontinuously. A sheet of carrier material is first coated with the liquid resin composition. This coating, which is preferably applied to both sides of the carrier, is applied by conventional means such as by dipping, spraying, rolling, or brushing. The solvent, if one is employed, is then allowed to evaporate, applying heat if necessary, leaving a tacky deposit of uncured thermosettable resin composition. This tacky coating is then contacted with the solid particulate resin composition. How this is effected is not critical, sprinkling, spraying, or dipping being equally effective. It is obviously desirable, however, that the entire surface of the tacky adhesive layer is covered evenly. The liquid resin is then converted into a hard, thermoset product, the solid particulate resin remaining in the curable state. When required for use, the film adhesive is cut to size and placed between, and in contact with, the two surfaces to be joined. It is then heated to at least its curing temperature and held at that temperature until the solid particulate resin composition has been converted into the fully cured, C-stage. The film adhesive may be stored at room temperature, either as flat sheets, or more conveniently when a web (i.e., a continuous sheet) of carrier material is employed, as a roll: an impermeable separating sheet may be rolled up with the film adhesive to prevent adhesion of one layer to the next.

The following Examples illustrate the invention. All parts are by weight and temperatures are in degrees Celsius. The resins and curing agents used in the Examples are as follows:

Urethane Resin I

This denotes a liquid urethane prepolymer having an available isocyanate content of 4.1%, prepared from a poly(oxytetramethylene) glycol and tolylene di-isocyanate.

Phenolic Resin Composition I

This denotes a solid mixture of a phenol-formaldehyde novolac and hexamine, the phenol-formaldehyde molar ratio was 1:0.85 and the hexamine content was 10.5%. The particle size of the mixture was 75–250 μm.

Epoxide Resin I

This denotes a liquid polyglycidyl ether of 2,2-bis(p-hydroxyphenyl) propane, having an epoxide content of 5.0–5.2 equivalents/kg.

Epoxide Resin Composition II

This denotes a finely powered solid composition comprising 27.8 parts of a polyglycidyl ether of 2,2-bis(p-hydroxyphenyl)propane having an epoxide content of 5.1–5.4 equivalents/kg, 7.6 parts of bis(p-aminophenyl)methane, and 64.6 parts of calcined china clay.

Epoxide Resin III

This denotes a urethane-modified epoxide resin having an epoxide content of 4.2 equivalents/kg, obtainable from Dow Chemical Corp. under the designation QX 3599.

Curing Agent I

This denotes a commercially available eutectic mixture of m-phenylenediamine and cumenediamine.

Curing Agent II

This denotes a mixtue of 9 parts of 2,4,6-tris(dimethylaminomethyl) phenol and 91 parts of a poly(aminoamide), obtained by the reaction of diethylenetriamine with a mixture of dimerised and trimerised linoleic acid, having an amine value of 210–220 mg KOH/g.

The test methods used were as laid down in these specifications:
a. metal-to-metal peel — DTD 5577 (British Ministry of Aviation, Aircraft Materials Spec. November 1965), using sheets of aluminium to BS 2L61, 0.55 and 2.61 mm thick,
b. tensile shear — United States Military Specification MMM-A-132, using sheets of "2024 T3 Alclad", an aluminium alloy, 1.63 mm thick,
c. impact peel resistance — impacts were applied to test speciments, set up as for the metal-to-metal peel test, by dropping a weight through a known distance onto the specimen and measuring the distance peeled on each impact.

The impact peel resistance equals $W(h + x)/x$
where
W denotes impact weight (g)
h denotes distance (cm) fallen by the weight, and
x denotes distance (cm) peeled.

EXAMPLE 1

A web of non-woven polyester fabric 10 cm wide and weighing 28 g/sq. meter was immersed in a bath containing a 20% solution in ethyl methyl ketone of 100 parts of Urethane Resin I and 6.2 parts of Curing Agent I. The web was dried at room temperature in a current of air, a tacky residue being left thereon, containing 149 g/sq. meter of Urethane Resin I.

The web was then passed into a container of Epoxide Resin Composition II so that it was evenly coated on both sides with a total of 154 g/sq. meter of this solid resin composition. The coated web was then wound onto a roller, together with an interleaving layer of polyethylene, and stored on the roll at room temperature. The urethane resin cured within 24 hours but the epoxide resin remained curable for in excess of 6 months.

EXAMPLE 2

The procedure of Example 1 was repeated using as the support a web of spun-bonded nylon fabric 10 cm wide and weighing 21 g/sq. meter. This carrier was immersed in a 50% solution in ethyl methyl ketone of 100 parts of Urethane Resin I and 6.2 parts of Curing Agent I. The web was dried as described in Example 1, leaving a tacky residue containing 134 g/sq. meter of Urethane Resin I.

The web was then evenly coated on both sides with a total of 144 g/sq. meter of Epoxide Resin Composition II, wound onto a roller, together with an interleaving layer of polyethylene, and stored at room temperature.

EXAMPLE 3

A web of nylon fabric as described in Example 2 was immersed in a 30% solution in dichloromethane of a mixture of 50 parts of Epoxide Resin I and 50 parts of Curing Agent II. The web was warmed in a current of air at 70° to evaporate the solvent, leaving a tacky residue on the web containing 40 g/sq. meter of Epoxide Resin I.

The web was then passed into a container of Phenolic Resin Composition I so that it was evenly coated on both sides with a total of 137 g/sq. meter of the powder, and then wound on a roller with an interleaving polyethylene layer and stored at room temperature. The epoxide resin cured within 24 hours but the phenolic resin remained curable, the shelf life of the film adhesive being in excess of 6 months.

EXAMPLE 4

A continuous strip of polypropylene 30 cm wide and 125 μm thick was coated on one side by means of a gravure roller with a 25% solution in dichloromethane of a mixture of 50 parts of Epoxide Resin III and 50 parts of Curing Agent II. The coated polypropylene was dried in a current of air at 70°, leaving a residue containing 7.5 g/sq. meter of Epoxide Resin III. Epoxide Resin Composition II was sprinkled evenly over the entire surface to a total of 70 g/sq. meter. The film was then stored at room temperature on a roller until required: the layer of Epoxide Resin III cured within 24 hours but that of Epoxide Resin Composition II remained curable for at least 6 months.

EXAMPLE 5

The film adhesive described in Example 1 was placed between pairs of sheets of aluminium or of aluminium alloy and heated at 130° for 10 minutes under a pressure of 700 kN/m². The peel strength of the joint was 7.87 kN/m at 22° and 5.07 kN/m at −16°, the impact peel resistance was 34 cm-kg/cm at 22° and 27 cm-kg/cm at −16°, and the tensile shear strength was 4.9 MN/m² at 22°.

EXAMPLE 6

The method of Example 5 was repeated, using the film adhesive described in Example 2. The test specimens had a peel strength of 5.43 kN/m at 22° and 2.80 kN/m at −16°, and an impact peel resistance of 10 cm-kg/cm at 22° and 9 cm-kg/cm at −16°.

We claim:

1. A film adhesive which comprises a layer of thermoset resin composition having adhering thereto solid particles of at least 60 μm and at most 1.5 mm of a thermosettable resin composition which is curable at an appreciable rate only at a temperature at least 30° C higher than that at which the thermoset resin composition has been cured.

2. An adhesive according to claim 1, supported on a carrier which is a solid, self-sustaining sheet.

3. An adhesive according to claim 2, in which the carrier bears on its opposite face a further layer of a thermoset resin composition having adhering thereto solid particles of a thermosettable resin composition.

4. An adhesive according to claim 1, in which the thermosettable resin composition is curable at an appreciable rate only at a temperature from 50° to 250° C higher than that at which the thermoset resin composition had been cured.

5. An adhesive according to claim 1, in which the thermoset resin composition had been cured at room temperature.

6. An adhesive according to claim 1, in which the thermosettable resin composition cures substantially only at temperatures above 70° C.

7. An adhesive according to claim 1, in which the said thermoset resin composition is a cured liquid thermosettable resin composition, the ratio by weight of the said liquid thermosettable resin composition to the said solid particles of a thermosettable resin composition being from 2:1 to 1:10.

8. An adhesive according to claim 1 wherein the layer of thermoset resin composition is selected from the group consisting of a polyurethane, a polyester, a phenol-aldehyde resin and an epoxide resin.

9. An adhesive according to claim 1 wherein the thermosettable resin composition is selected from the group consisting of an epoxide resin in the B-stage, an epoxide resin advanced by reaction with a diol, a phenolic resole in the B-stage and a polyamic acid intermediate of a polyimide.

10. An adhesive according to claim 2 wherein said carrier is selected from the group consisting of paper, foraminous structures such as textiles of nylon, polyester or glass fiber, polyethylene film, polypropylene film and aluminum foil.

* * * * *